US010216831B2

(12) United States Patent
Murdock

(10) Patent No.: US 10,216,831 B2
(45) Date of Patent: Feb. 26, 2019

(54) SEARCH RESULTS SUMMARIZED WITH TOKENS

(75) Inventor: Vanessa Graham Murdock, Barcelona (ES)

(73) Assignee: Excalibur IP, LLC, New York, NY (US)

( * ) Notice: Subject to any disclaimer, the term of this patent is extended or adjusted under 35 U.S.C. 154(b) by 745 days.

(21) Appl. No.: 12/782,999

(22) Filed: May 19, 2010

(65) Prior Publication Data

US 2011/0289080 A1 Nov. 24, 2011

(51) Int. Cl.
*G06F 17/30* (2006.01)

(52) U.S. Cl.
CPC .............................. *G06F 17/30651* (2013.01)

(58) Field of Classification Search
USPC .................................................. 707/725–730
See application file for complete search history.

(56) References Cited

U.S. PATENT DOCUMENTS

| 7,567,959 | B2 * | 7/2009 | Patterson | |
|---|---|---|---|---|
| 7,702,618 | B1 * | 4/2010 | Patterson | 707/999.003 |
| 8,805,840 | B1 * | 8/2014 | Joshi | 707/737 |
| 2002/0065857 | A1 * | 5/2002 | Michalewicz et al. | 707/532 |
| 2005/0216443 | A1 * | 9/2005 | Morton et al. | 707/3 |
| 2005/0240580 | A1 * | 10/2005 | Zamir et al. | 707/4 |
| 2007/0078889 | A1 * | 4/2007 | Hoskinson | G06F 17/30705 |
| 2008/0140616 | A1 * | 6/2008 | Encina et al. | 707/3 |
| 2009/0182727 | A1 * | 7/2009 | Majko | G06F 17/30867 |
| 2009/0265631 | A1 | 10/2009 | Sigurbjornsson | |
| 2010/0121861 | A1 * | 5/2010 | Marsden | G06Q 50/02 707/752 |
| 2010/0131899 | A1 * | 5/2010 | Hubert | G06F 17/30917 715/823 |
| 2010/0153324 | A1 * | 6/2010 | Downs et al. | 706/21 |
| 2010/0229082 | A1 * | 9/2010 | Karmarkar | H04M 1/72547 715/205 |
| 2010/0235342 | A1 * | 9/2010 | Bourges-Waldegg | G06F 17/30997 707/707 |
| 2011/0125764 | A1 * | 5/2011 | Carmel et al. | 707/749 |
| 2011/0271232 | A1 * | 11/2011 | Crochet | G06F 17/2211 715/810 |

(Continued)

OTHER PUBLICATIONS

"TagExplorer," Sandbox from Yahoo! Research, http://sandbox.yahoo.com/tagexplorer, downloaded Mar. 22, 2010.

(Continued)

*Primary Examiner* — Mark D Featherstone
*Assistant Examiner* — Navneet Gmahl
(74) *Attorney, Agent, or Firm* — Berkeley Law & Technology Group, LLP

(57) ABSTRACT

In one embodiment, a first computing device accesses a first search query issued by a user and one or more first documents identified in response to the first search query; determines a first set of tokens for each of the first documents; and transmits the first documents and their associated first sets of tokens to a second computing device associated with the user for display to the user, wherein: each of the first documents is displayed together with its associated first set of tokens; and the tokens of each of the first sets of tokens are visually distinguished based on the concepts they represent and their levels of relevance with respect to the first document associated with the first set of tokens.

14 Claims, 4 Drawing Sheets

— 100B

— 110

112 — Barcelona - Wikipedia, the free encyclopedia

114B — architecture   la sagrada familia   catalonia   catalonian

116 — sagrada familia   espana   europe
en.wikipedia.org/wiki/Barcelona - 276k - Cached

— 120

122 — Barcelona Travel Guide, Catalonia, Spain

124B — antoni gaudi   gaudi   architecture   beach

126 — casinos   hotel   catalonia   catalunya
www.aboutbarcelona.com - 88k - Cached

(56) References Cited

U.S. PATENT DOCUMENTS

2012/0102033 A1\* 4/2012 Sarshar ............ G06F 17/30784
　　　　　　　　　　　　　　　　　　　　　　707/737
2012/0278300 A1\* 11/2012 Soubbotin ......... G06F 17/30719
　　　　　　　　　　　　　　　　　　　　　　707/706

OTHER PUBLICATIONS

"TagExplorer," Sandbox from Yahoo! Research, http://tagexplorer.sandbox.yahoo.com/index.php?query=barcelona&sessionid=fa1e191acd574739b2f553abfd6dd917, downloaded on Mar. 22, 2010, dated 2008.

\* cited by examiner

100A

110

112 — Barcelona - Wikipedia, the free encyclopedia
114A — Barcelona is the capital and the most populous city of the Autonomous Community of Catalonia and the second largest city in Spain, with a population of 1,615,908 in 2008. It is the ...
116 — en.wikipedia.org/wiki/Barcelona - 276k - Cached

120

122 — Barcelona Travel Guide, Catalonia, Spain
124A — General guide to the city with information on where to go, what to do, location transpiration, and online postcards from Barcelona.
126 — www.aboutbarcelona.com - 88k - Cached FIGURE 1A (prior art)

100B

110

112 — Barcelona - Wikipedia, the free encyclopedia
114B — architecture   la sagrada familia   catalonia   catalonian
  sagrada familia   espana   europe
116 — en.wikipedia.org/wiki/Barcelona - 276k - Cached

120

122 — Barcelona Travel Guide, Catalonia, Spain
124B — antoni gaudi   gaudi   architecture   beach
  casinos   hotel   catalonia   catalunya
126 — www.aboutbarcelona.com - 88k - Cached

FIGURE 1B

SEARCH RESULTS SUMMARIZED WITH TOKENS

TECHNICAL FIELD

The present disclosure generally relates to improving the quality of search results identified for search queries and more specifically relates to summarizing the individual documents included in the search results with tokens extracted from the documents.

BACKGROUND

The Internet provides a vast amount of information. The individual pieces of information are often referred to as "network resources" or "network contents" and may have various formats, such as, for example and without limitation, texts, audios, videos, images, web pages, documents, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer, a smart mobile telephone, etc.) connected to the Internet.

However, due to the sheer amount of information available on the Internet, it is impractical as well as impossible for a person (e.g., a network user) to manually search throughout the Internet for specific pieces of information. Instead, most network users rely on different types of computer-implemented tools to help them locate the desired network resources or contents. One of the most commonly and widely used computer-implemented tools is a search engine, such as the search engines provided by Microsoft® Inc. (http://www.bing.com), Yahoo!® Inc. (http://search.yahoo.com), and Google™ Inc. (http://www.google.com). To search for information relating to a specific subject matter or topic on the Internet, a network user typically provides a short phrase or a few keywords describing the subject matter, often referred to as a "search query" or simply "query", to a search engine. The search engine conducts a search based on the search query using various search algorithms and generates a search result that identifies network resources or contents that are most likely to be related to the search query. The network resources or contents are presented to the network user, often in the form of a list of links, each link being associated with a different network document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher and consequently are presented to the network user before the network resources or contents that are relatively less relevant to the search query. The search engine may also provide a short summary of each of the identified network resources or contents.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of search results identified for search queries and more specifically relates to summarizing the individual documents included in the search results with tokens extracted from the documents.

In particular embodiments, a first computing device accesses a first search query issued by a user and one or more first documents identified in response to the first search query; determines a first set of tokens for each of the first documents; and transmits the first documents and their associated first sets of tokens to a second computing device associated with the user for display to the user.

In particular embodiments, to determine the first set of tokens for one of the first documents comprises: extracting one or more tokens from the first document; for each of the extracted tokens, identifying a concept represented by the extracted token; determining a level of importance for the extracted token with respect to the first document; and determining a level of relationship for the extracted token with respect to the search query; and for each unique pair of extracted tokens, determining a level of co-occurrence for the pair of extracted tokens; for each of the extracted tokens, determining a level of relevance for the extracted tokens with respect to the first document based on (1) its level of importance with respect to the first document, (2) its level of relationship with respect to the search query, and (3) its levels of co-occurrence with other ones of the extracted tokens; and selecting one or more of the extracted tokens that are most relevant to the first document to form the first set of tokens.

In particular embodiments, each of the first documents is displayed together with its associated first set of tokens; and the tokens of each of the first sets of tokens are visually distinguished based on the concepts they represent and their levels of relevance with respect to the first document associated with the first set of tokens.

These and other features, aspects, and advantages of the disclosure are described in more detail below in the detailed description and in conjunction with the following figures.

BRIEF DESCRIPTION OF THE DRAWINGS

FIG. 1A (prior art) illustrates a search result where the documents contained therein are summarized with short paragraphs.

FIG. 1B illustrates a search result where the documents contained therein are summarized with tokens extracted from the documents.

DETAILED DESCRIPTION

Figure 2:
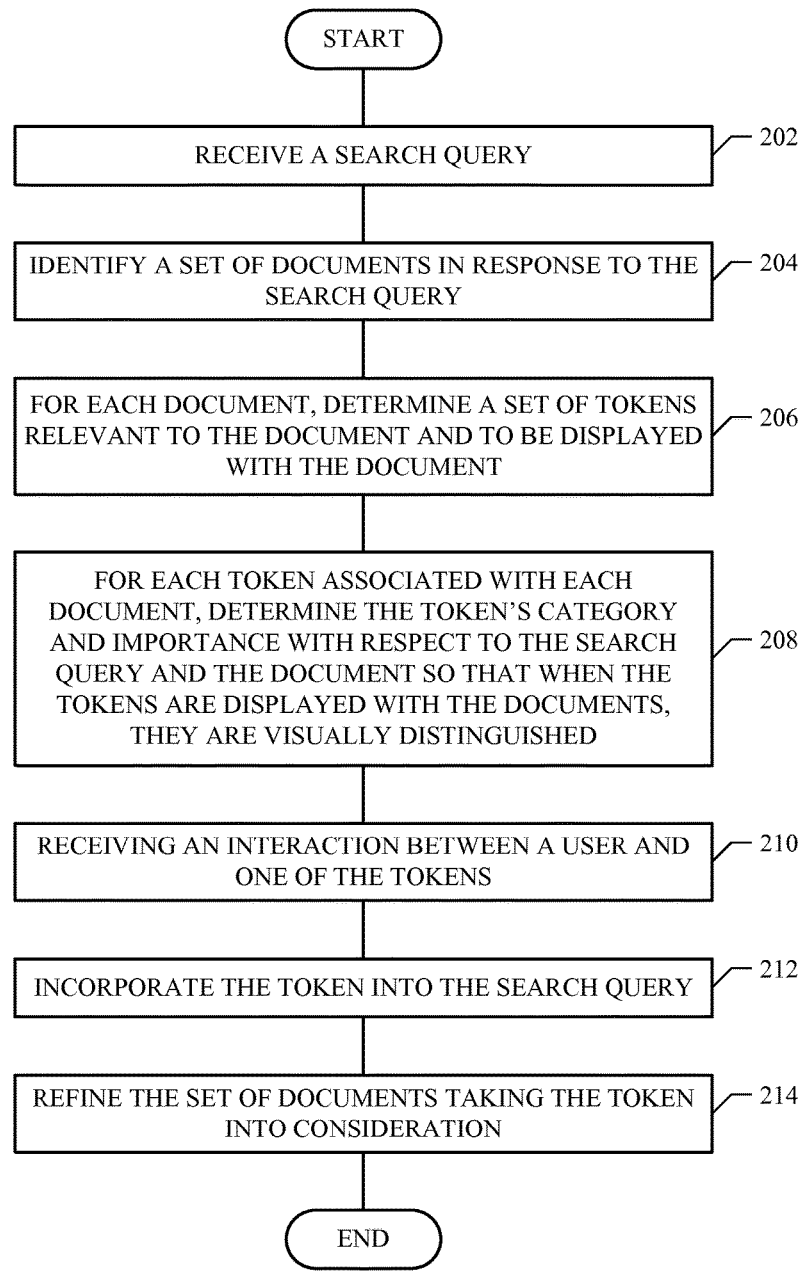
FIG. 2 illustrates a method for summarizing a document with one or more tokens.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information relevant to specific subject matters or topics on a network or in a database, such as the Internet, the World Wide Web, or an Intranet. To conduct a search, a user may issue a search query to the search engine. The search query generally contains one or more words or numbers that describe a subject matter. In response, the search engine may identify one or more documents that are likely to be related to the search query, which may collectively be referred to as a "search result" identified for the search query. The documents may have any format, such as, for example and without limitation, web pages, executable files, multimedia files (e.g., image, video, or audio), and text files (e.g., Microsoft World files or Adobe Portable Document Format (PDF) files). Each document may include one or more words or numbers, either in its main content or in its associated metadata. Each word or number may be generally referred to as a "token".

Sophisticated search engines implement many other functionalities in addition to merely identifying the documents as a part of the search process. For example, a search engine usually ranks the documents identified for a search query according to their relative degrees of relevance with respect to the search query, such that the documents that are relatively more relevant to the search query are ranked higher and consequently are presented to the network user before the documents that are relatively less relevant to the search query. The search engine may also provide a short summary of each of the identified documents.

FIG. 1A (prior art) illustrates an example search result 100A that identifies two documents and more specifically, two web pages 110, 120. Search result 100A is generated in response to an example search query "Barcelona". Note that only two documents are illustrated in order to simplify the discussion. In practice, a search result may identify hundreds, thousands, or even millions of documents. Web pages 110, 120 each include a title 112, 122, a short summary 114A, 124A that briefly describes the corresponding document, and a clickable link 116, 126 in the form of a URL. For example, document 110 is a web page provided by WIKIPEDIA that contains information concerning the city of Barcelona. There is a brief summary 114A that describes the content of web page 110, which may help a user to determine whether to click on link 116 in order to further review the full content of web page 110 in more detail. In FIG. 1A, summaries 114A and 124A are each in the form of a short, descriptive paragraph, often referred to as a "snippet".

A short, descriptive paragraph may not be the only method to provide a summary for a document. In particular embodiments, one or more tokens, including words or numbers, that are relevant to the content of a document may be provided in the place of the summary for the document, replacing the traditional descriptive paragraph. Particular embodiments may further organize these tokens into categories based on their semantic classes, such as, for example and without limitation, who, what, where, when, and how, and associate an icon with each token so that by clicking on a icon, the corresponding token may be added to the search query to further refine the search result. This may encourage the users to refine their searches by providing integrated search suggestions.

FIG. 1B illustrates an example search result 110B that identifies the same two web pages 110, 120 as illustrated in FIG. 1A but having tokens as their summaries 114A, 114B. For example, for document 110, its summary 114B includes the following seven tokens: architecture, la sagrada familia, catalonia, catalonian, sagrada familia, espana, and Europe. There is an icon (e.g., a plus sign) associated with each token. Similarly, for document 120, its summary 124B includes the following eight tokens: antoni gaudi, gaudi, architecture, beach, casino, hotel, catalonia, and catalunya, and there is an icon associated with each token. Furthermore, the tokens may be visually distinguished from each other using, for example and without limitation, different fonts, different font sizes or colors, or different highlights.

FIG. 2 illustrates a method for summarizing a document with one or more tokens. The steps of FIG. 2 are described in connection with FIG. 1B. In particular embodiments, upon receiving a search query (e.g., search query "Barcelona") from a user (step 202), a search engine may identify a set of documents in response to the search query using any suitable search algorithm (step 204). There may be one or more documents in the set, and each document may have any format, such as, for example and without limitation, text documents, multimedia documents, and executable documents.

For each document in the set, particular embodiments may determine a set of tokens relevant to the content of the document (step 206). Each set of tokens determined for each document may include one or more tokens. A token may be a word or a number or a mix of alphabets and digits or a phrase including multiple words or numbers. For each document, the set of tokens may be extracted from the main content or from the metadata of the document. When the documents are included in a search result for the search query and displayed, each document may be displayed with its associated set of tokens, such as in the example illustrated in FIG. 1B.

Given a document identified for a search query, the document may include one or more words or numbers or symbols in its main content or in its associated metadata. Particular embodiments may extract the set of tokens by parsing the main content or the metadata of the document and then analyze the individual tokens to determine their concept categories and importance with respect to the document and the search query. Again, each token may include one or more words, numbers, symbols.

First, particular embodiments may parse the words, numbers, and symbols in the document to extract individual tokens that represent specific concepts, such as, for example and without limitation, locations (e.g., street, city, county, state, country), sites of interest (e.g., cathedrals, museums, architecture, buildings, squares), people (e.g., first name, last name), business types, business categories, business names, or events (e.g., theater, concerts, sports, festivals, fairs). A concept may be associated with each token extracted from the document (step 208).

In particular embodiments, the tokens may be automatically extracted from the document and the concepts of the individual tokens may be automatically identified using a concept model trained with machine learning. Briefly, machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". In this case, the training data may contain a set of documents where the tokens in the documents that represent specific concepts have been annotated with their respective concepts by humans. The documents, together with their conceptually annotated tokens, may then be used to train a concept model so that the concept model may learn to identify individual tokens and the concepts they represent from the documents. Once trained, the concept model may be used to extract tokens from a document and identify the concepts represented by these tokens.

In particular embodiments, concepts represented by the tokens may be grouped into one or more concept categories. In particular embodiments, similar or related concepts may be grouped together into a specific concept category. For example, Washington D.C., New York City, Boston, Chicago, San Francisco, Los Angeles, and Denver may each be a concept. However, they are all different cities of the United States. Thus, these concepts may be grouped into a "city" concept category.

In addition, in particular embodiments, the concept model may compute a co-occurrence score for each unique pair of tokens extracted from the document. The co-occurrence score may indicate how frequently the two tokens of the pair are found together in the document itself as well as in the documents used to train the concept model. For example, if the two tokens are often found together in many documents, the pair may have a relatively high co-occurrence score. In particular embodiments, the co-occurrence score for two tokens may be relatively high when the two tokens are found together most of the time, even if they are not often found at all in certain specific documents. To further illustrate, consider two example tokens "new" and "york". When the token "york" is found, it is most often proceeded by the token "new". Thus, in general (i.e., for most documents), the two tokens "new" and "york" have a relatively high co-occurrence score. Only when a document has many appearances of the token "york" but is preceded by some token other than "new" would the co-occurrence score for the two tokens "new" and "york" be relatively low for this document. Conversely, if the two tokens are rarely found together in the documents, the pair may have a relatively low co-occurrence score. For example, consider two example tokens "hot" and "dog". If, in general, the token "dog" is often preceded by some token other than the token "hot", such as "good" or "hunting", then the two tokens "hot" and "dog" may have a relatively low co-occurrence score. Even if a particular document may have many appearances of the two tokens "hot" and "dog" being together, the overall co-occurrence score for the two tokens "hot" and "dog" may still be relatively low. The concept model may compute the co-occurrence score for a pair of tokens based on the frequency of the two tokens being found together in the document itself as well as the frequencies the two tokens being found together in the documents used to train the concept model.

Second, for each of the tokens extracted from the document, particular embodiments may determine its relative importance in the document (step 208). The importance of a token in a document may be determined based on many factors and these factors may vary depending on the concept the token represents. For example, if a token appears many times in the document, it may be considered relatively more important than a token that appears only a few times in the document. In this case, the importance of a token may partially depend on its frequency of appearance in the document. If a token is a location (e.g., a city), then its importance may partially depend on the population of the city, such that a city with a relatively larger population may be considered more important than a city with a relatively smaller population. If a token is an event, then its importance may partially depend on how recent the event is, such that a more recent event may be considered more important than an older event. If a token is a person, then its importance may partially depend on how famous the person is, such that a well-known person (e.g., politicians, celebrities) may be considered more important than a person of obscurity.

In particular embodiments, the relative importance of the individual tokens may be automatically determined using a token-importance model, also trained with machine learning or implemented using any suitable algorithm. An importance score may be computed for each token extracted from the document, and the importance score may represent the relative level of importance the token is with respect to the document. For example, the higher the importance score, the more important a token is with respect to the document, and vice versa. Again, the importance score may be computed for each token based on various factors, and these factors may vary among individual tokens.

Third, for each of the tokens extracted from the document, particular embodiments may determine its relationship with respect to the search query for which the document has been identified, as described in connection with step 204. For example, if a token includes some or most or all of the words in the search query, then the token may be considered to have a relatively strong relationship with respect to the search query. Conversely, if a token does not include any of the words in the search query, then the token may be considered to have a relatively weak relationship with respect to the search query. Again, a relationship score may be computed for each token. For example, the higher the relationship score, the stronger the relationship between the token and the search query. Conversely, the lower the relationship score, the weaker the relationship between the token and the search query.

Other factors may also be considered. In particular embodiments, for each token extracted from the document, its relevance to the document may then be determined based on all the individual factors, including, for example and without limitation, the concept represented by the token, the co-occurrence between the token and other tokens extracted from the document, the importance of the token with respect to the document, and the relationship of the token with respect to the search query. Particular embodiments may select any number of the most relevant tokens to be included in the set of tokens for the document. The actual number of tokens selected in a set may vary from document to document. For example, if a large number of tokens have been extracted from the document, then the number of tokens included in the set for the document may be relatively more. Conversely, if a small number of tokens have been extracted from the document, then the number of tokens included in the set for the document may be relatively less. As another example, the number of tokens included in the set for the document may also depend on the amount of space in a web page in which the document, together with its set of tokens, are to be displayed.

When the search result for the search query is displayed, each of the documents included the search result may be displayed with its associated set of tokens, such as in the example illustrated in FIG. 1B. In addition, in particular embodiments, for each of the documents, its set of tokens may be visually distinguished using any suitable means. For example, tokens that belong to the same concept category may be displayed in the same color (e.g., all tokens that represent locations are displayed in blue, and all tokens that represent people are displayed in green). Relatively more important tokens may be displayed in a larger size than relatively less important tokens. These visual distinctions may help a user to identify the more important tokens.

When the user views the search result (i.e., the documents and their respectively associated sets of tokens), the user may interact with any one of the tokens. In particular embodiments, the individual tokens may be clickable themselves, and a user may click on any one of the tokens. In particular embodiments, each token may be associated with a clickable icon, such as in the example illustrated in FIG. 1B, which is displayed with the token, and the user may click on the icon associated with any one of the tokens. If the user clicks on a token or an icon associated with the token, the interaction may be transmitted to the search engine. Upon receiving the interaction between the user and the token (step 210), the search engine may incorporate the token into the original search query to construct a new search query that includes both the original search query and the token clicked by the user (step 212). The search engine may then refine the search using the new search query (e.g., identify a new set of documents using the new search query and transmit the new set of documents to the user) (step 214).

Figure 3:
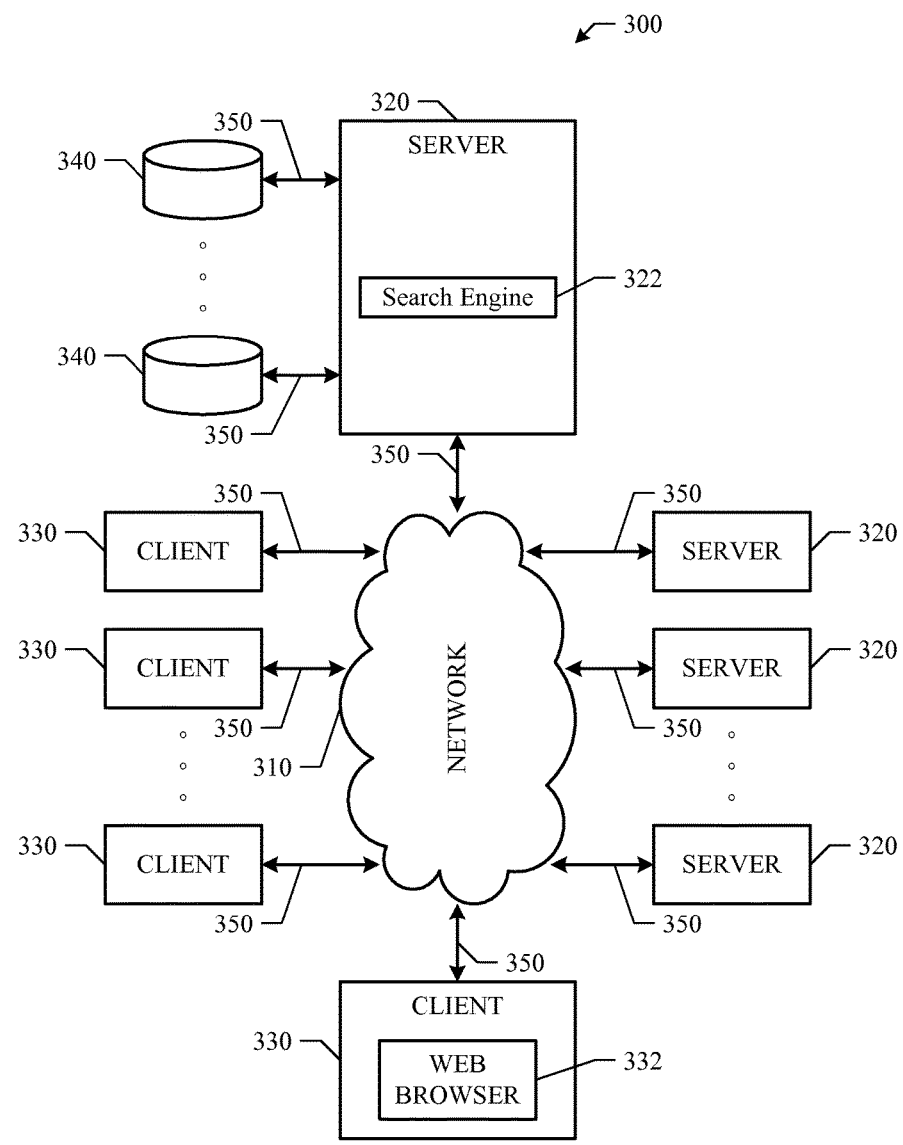
FIG. 3 illustrates an example network environment.

Particular embodiments may be implemented in a network environment. FIG. 3 illustrates an example network environment 300 suitable for providing software validation as a service. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. The present disclosure contemplates any suitable network 310.

One or more links 350 couple a server 320 or a client 330 to network 310. In particular embodiments, one or more links 350 each includes one or more wireline, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, a server 320 may include a search engine 322. Search engine 322 may include hardware, software, or embedded logic components or a combination of two or more such components for carrying out the appropriate functionalities implemented or supported by search engine 322. For example and without limitation, search engine 322 may implement one or more search algorithms that may be used to identify documents in response to the search queries received at search engine 322, one or more ranking algorithms that may be used to rank the identified documents, one or more summarization algorithms that may be used to summarize the identified documents, and so on. One of the summarization algorithms implemented by search engine 322 may be similar to that illustrated in FIG. 2.

In particular embodiments, one or more data storages 340 may be communicatively linked to one or more servers 320 via one or more links 350. In particular embodiments, data storages 340 may be used to store various types of information. In particular embodiments, the information stored in data storages 340 may be organized according to specific data structures. In particular embodiment, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. The present disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 4:
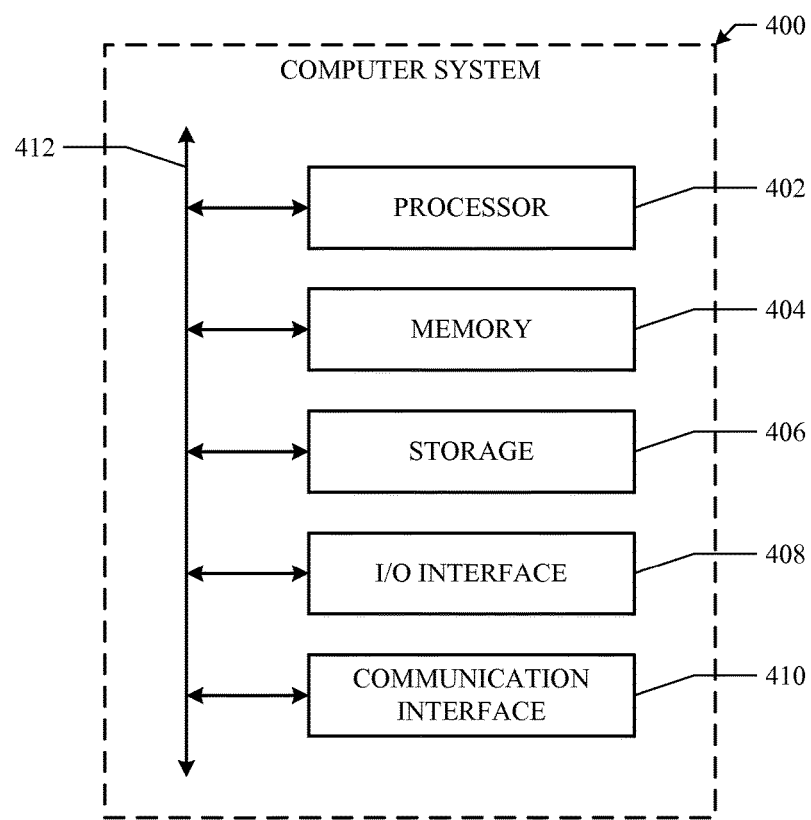
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    receiving, at a computing device, one or more signals, the one or more signals comprising:
    search results comprising links to one or more documents identified in response to a first search query; and
    a first set of tokens for a first document, of the one or more documents, comprising one or more tokens determined based, at least in part, on:
        a relationship for individual ones of the first set of tokens with respect to the first search query and the first document based, at least in part, on a measure of importance with respect to the first document wherein the measure of importance for a particular token is determined based, at least in part on at least one of:
            a population of a particular location at least partially in response to determining that the particular token refers to the particular location,
            a relative recency of an occurrence of a particular event at least partially in response to determining that the particular token refers to the particular event,
            a level of fame of a particular person at least partially in response to determining that the particular token refers to the particular person, or any combination thereof;
        wherein the individual ones of the first set of tokens comprise one or more words or numbers extracted from content displayed for the first document or from other content relating to the content displayed for the first document;
    displaying, via a display device, a link to the first document and the first set of tokens based, at least in part, on one or more represented concepts or one or more levels of relevance with respect to the first document, wherein at least one token of the first set of tokens is visually distinguished from other tokens of the first set of tokens via at least one characteristic;
    transmitting an interaction between a user and an individual one of the first set of tokens; and
    constructing a second search query comprising the first search query and the one of the tokens with which the user has engaged in the interaction, identifying one or more second documents for the second search query, determine a second set of tokens for the second documents, and processing one or more links to the second documents and an associated second sets set of tokens received for display to the user.

2. The method recited in claim 1, wherein at least one of the first token is visually distinguished from the other ones of the first set of tokens by:
    displaying the at least one of the first token or the second token with one or more colors, one or more of the one or more colors to represent a different category of concepts; and
    displaying the at least one of the first token or the second token with one or more font sizes, one or more of the one or more font sizes to indicate a level of relevance that individual ones of the first set of tokens have with respect to the first document.

3. The method recited in claim 1, wherein the first document and at least one of the second documents comprise the same document.

4. The method recited in claim 3, wherein the first set of tokens and the second set of tokens comprise one or more same tokens.

5. The method of claim 1, wherein
    one or more tokens are extracted from the first document; and
    a level of relationship for the extracted one or more tokens with respect to the search query is determined.

6. The method of claim 5, wherein a concept represented by the one or more extracted token is identified, and a level of importance for the one or more extracted tokens is determined with respect to the first document.

7. A system, comprising:
    a memory to store executable instructions; and
    one or more processors capable of executing the instructions to:
        process one or more signals to be received at a computing device, the one or more signals to comprise:
            search results to comprise links to one or more documents to be identified in response to a first search query; and
            a first set of tokens for a first document, of the one or more documents, to comprise one or more tokens based, at least in part, on:
                a relationship for the individual ones of the first set of tokens with respect to the first search query and the first document to be based, at least in part, on a measure of importance with respect to the first document, wherein the measure of importance for a particular token is to be determined based, at least in part on at least one of:
                    a population of a particular location at least partially in response to a determination that the particular token refers to the particular location,
                    a relative recency of an occurrence of a particular event at least partially in response to a determination that the particular token refers to the particular event,
                    a level of fame of a particular person at least partially in response to a determination that the particular token refers to the particular person, or any combination thereof;
                wherein the individual ones of the first set of tokens to comprise one or more words or numbers to be extracted from content to be displayed for the first document or from other content to be related to the content to be displayed for the first document;

display, via a display device, a link to the first document and the first set of tokens to be based, at least in part, on one or more represented concepts or one or more levels of relevance with respect to the first document, wherein at least one token of the first set of tokens is to be visually distinguished from other tokens of the first set of tokens via at least one characteristic transmit an interaction between a user and an individual one of the first set of tokens; and construct a second search query comprising the first search query and the one of the tokens with which the user has engaged in the interaction, identifying one or more second documents for the second search query, determine a second set of tokens for the second documents, and processing one or more links to the second documents and an associated second sets set of tokens received for display to the user.

8. The system recited in claim 7, the individual ones of the first set of tokens are to be capable of being displayed with one or more colors, the one or more of the colors to represent a different category of concepts; and the tokens are to be capable of being displayed with one or more font sizes, the one or more of the font sizes to indicate a level of relevance of the tokens with respect to the first document.

9. The system recited in claim 7, wherein the first document and one of the second documents are to comprise the same document.

10. The system recited in claim 9, wherein the first set of tokens and the second set of tokens are to comprise one or more same tokens.

11. One or more computer-readable tangible storage media to store instructions executable by one or more computing devices to:

process one or more received signals, the one or more received signals to comprise:

search results to comprise links to one or more documents to be identified in response to a first search query; and a first set of tokens for a first document, of the one or more documents, to comprise one or more tokens to be based, at least in part, on:

a relationship for individual ones of the first set of tokens with respect to the first search query and the first document to be based, at least in part, on a measure of importance with respect to the first document, wherein the measure of importance for a particular token is to be determined based, at least in part on at least one of:

a population of a particular location at least partially in response to a determination that the particular token refers to the particular location, a relative recency of an occurrence of a particular event at least partially in response to a determination that the particular token refers to the particular event, a level of fame of a particular person at least partially in response to a determination that the particular token refers to the particular person, or any combination thereof;

wherein the individual ones of the first set of tokens to comprise one or more words or numbers to be extracted from content to be displayed for the first document or from other content to be related to the content to be displayed for the first document;

display, via a display device, a link to the first document and the first set of tokens to be based, at least in part, on one or more represented concepts or one or more levels of relevance with respect to the first document, wherein at least one token of the first set of tokens is to be visually distinguished from other tokens of the first set of tokens via at least one characteristic;

initiate transmission of an interaction between a user and an individual one of the first set of tokens; and construct a second search query comprising the first search query and the one of the tokens with which the user has engaged in the interaction, identifying one or more second documents for the second search query, determine a second set of tokens for the second documents, and processing one or more links to the second documents and an associated second sets set of tokens received for display to the user.

12. The one or more computer-readable tangible storage media recited in claim 11, wherein the individual ones of the first set of tokens are to be capable of being displayed with one or more colors, the one or more of the colors to represent a category of concepts; and the individual ones of the first set of tokens are to be capable of being displayed with one or more font sizes, the one or more of the font sizes to indicate a level of relevance of the tokens with respect to the first document.

13. The one or more computer-readable tangible storage media recited in claim 11, wherein the first document and one of the second documents are to comprise the same document.

14. The one or more computer-readable tangible storage media recited in claim 13, wherein the first set of tokens and the second set of tokens are to comprise one or more same tokens.

* * * * *